Feb. 23, 1971  E. F. SCHWARZENBEK  3,565,790
FLUID POWDER REACTION SYSTEM
Filed April 13, 1966
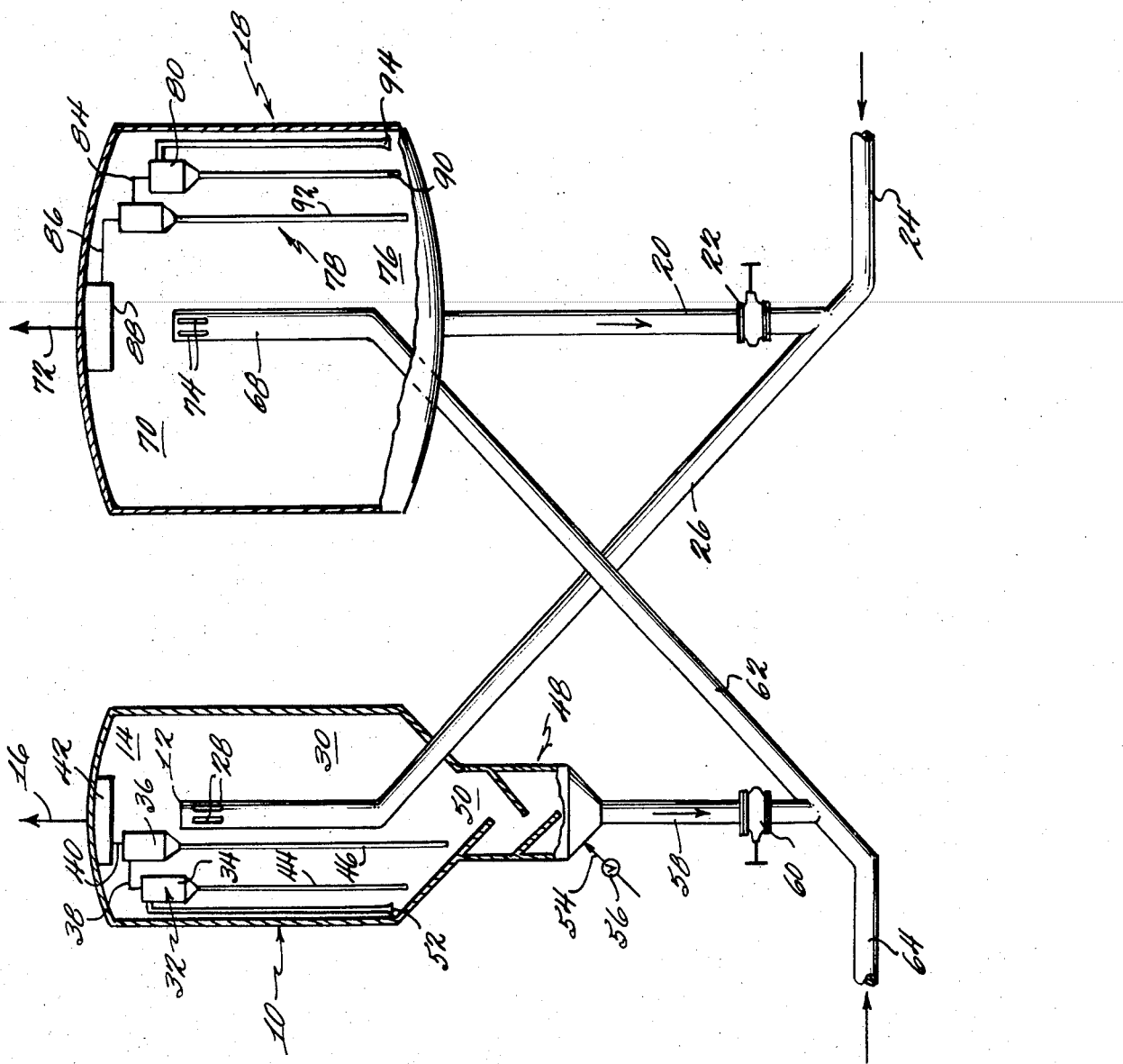
INVENTOR
EUGENE F. SCHWARZENBEK
BY
Cushman, Darby & Cushman
ATTORNEYS

United States Patent Office 3,565,790
Patented Feb. 23, 1971

3,565,790
FLUID POWDER REACTION SYSTEM
Eugene F. Schwarzenbek, 20 Randall Drive,
Short Hills, N.J. 07078
Filed Apr. 13, 1966, Ser. No. 542,330
Int. Cl. C10g *13/18*
U.S. Cl. 208—153       4 Claims

ABSTRACT OF THE DISCLOSURE

A process and apparatus for contacting a gas with a finely divided solids in a reactor. A suspension of the finely divided solids flows downwardly in the reactor.

---

The present invention is directed to novel apparatus and method for contacting gases and finely divided solids. More particularly the present invention is concerned with apparatus and process conditions for effecting catalytic or chemical reactions in a vessel with separation means arranged therein and wherein a concurrent downflow of a dilute phase of gas and finely divided solids is established through a reaction zone to inlet lines of the separation means located in the bottom section of the reaction vessel.

In recent years, fluidized solids technique has assumed increasing popularity in the petroleum and other allied process industries. For instance, the technique was first introduced in the late 1930's and was extensively used during World War II in the catalytic cracking of petroleum oils for the production of butylenes for rubber and base stock for aviation gasoline. Since that time this technique has spread extensively to other catalytic and chemical applications such as hydroforming, coking and ore reduction. A prime advantage of this processing technique lies in its ability to transport large quantities of finely divided solids and heat, and in the characteristics of the fluid bed of giving a uniform temperature throughout the bed even though a highly endothermic or exothermic reaction takes place.

Generally, however, the advantages of the technique have been obtained at a sacrifice in the efficiency of contact between the gases and the finely divided solids in the reaction zone. Further, gas recirculation in the fluid bed has been found to result in over conversion of the gaseous feed, while the completely mixed nature of the fluid bed has been found to prevent desirably high conversions of the finely divided solid, especially in chemical reaction systems.

It has now been found, by the applicant, that the instant invention eliminates the undesirable characteristics of conventional fluidized solid techniques while preserving the desirable characteristics thereof so that highly desirable characteristics of selectivity of reaction and improved economics of operation inure to the practitioner of this invention. As specific illustrations of the catalytic and chemical reactions for which the instant invention is ideally suited, reference will be made to fluid catalytic cracking and fluid reduction of iron ore although it will be recognized that the broad principles and concepts of the invention are adaptable to a myriad of processing environments.

CATALYTIC CRACKING PROCESS AND APPARATUS

The catalytic cracking process has progressed through many stages of development since its introduction prior the World War II. There was initially the Houdry fixed bed process. Later this developed into a moving catalyst bed process with the catalyst flowing either countercurrent to or concurrent with the oil vapors. About the same time, the fluid process was developed, in which a dense bed of powdered catalyst was employed in which the oil vapors flowed upward while the catalyst was fed at the bottom and continuously withdrawn from the top or bottom of the bed. More recently dilute phase versions of the process have appeared.

The fluid process has become widely accepted as the most economic way to catalytically crack high boiling petroleum oils to lower boiling gasoline and heating oil. The main advantage of the fluid process over fixed bed Houdry cracking and moving bed TCC and Houdriflow cracking lies in its ability to circulate large quantities of catalyst and to maintain balanced heat and uniform temperatures in the reaction and regeneration sections of the process. However it is generally agreed that the fluid bed technique does not give as good product distribution as the moving bed processes. This is attributable to the fact that in the fluid technique the catalyst in the dense bed is perfectly mixed and therefore is not of uniform age or activity. Some of the catalyst is freshly regenerated and some is relatively old in age, with the result that some is low in carbon content and some is high in carbon content. As a consequence, the cracking is performed over catalyst of variable quality, some of the catalyst giving good product distribution, some giving poor product distribution. Furthermore, there is the added disadvantage of the fluid bed technique in that due to the extensive mixing of the powder in the bed there are also considerable amounts of gas being recirculated from the top to the bottom of the bed. High priced gasoline, about to leave the top of the bed, is recirculated to the bottom and is cracked to low value fuel gas and coke.

In an effort to overcome some of the disadvantages of conventional fluidized solid techniques, such systems have been modified by operating in a dilute phase system. While true high velocity transfer line is considered ideal, nevertheless a unit embodying this principle requires an abnormally long transfer line and therefore is believed to be economically infeasible. For example, it has been calculated that about 800-foot transfer line would be required to replace a conventional 40-foot reactor. Accordingly, a low velocity upflow dilute phase reactor is now used to obtain longer contact time with less overall unit height. This design effectively eliminates gas recycling and this type of recracking of gasoline product. A very serious shortcoming of this system, however, is that a substantial portion of the catalyst entering with the oil feed by-passes the reactor and flows directly downward to the stripper and out to the regenerator. The amount of by-passing is a function of the physical properties of the system, such as gas velocity, inlet catalyst concentration, catalyst particle size, and reactor height. In a reactor system of average present day design, only about 25%% of the catalyst entering with the oil vapors reaches the top of the reactor and exits with the vapors through the cyclone recovery system. The remainder of the catalyst by-passes, to various extents, the reaction section of the unit. Since a substantial portion of the catalyst that leaves the feed line by-passes the reaction zone, poor catalyst utilization is realized. Furthermore, the catalyst that flows through the reaction zone resides therein for an abnormally long time, is high in carbon content and, consequently, gives poor product distribution.

The instant invention overcomes the disadvantages of such prior art techniques by providing a reaction system which gives true concurrent flow of catalyst and hydrocarbon vapors, avoids gas recycling and recracking, gives substantially uniform catalyst holding time and catalyst carbon content. These characteristics result in improved product distribution and catalyst activity with an overall improvement in economics of operation.

Accordingly, as one embodiment, the instant invention is directed to novel apparatus for effecting contacting of gases and finely divided solids comprising a vessel, gas-solids separation means in communication with the interior of said vessel, gas-solids inlet means in communication with the upper portion of said vessel, gas-solids separation inlet means in communication with the lower portion of said vessel, said gas-solids separation means adapted to receive gasiform solid particle containing streams from the lower portion of said vessel and to discharge gaseous material from said gas-solids separation means and said vessel and means to withdraw finely divided solids adjacent the bottom portion of said vessel.

The particular arrangement of gas-solids inlet means and gas-solids separation inlet means provides a downflow of gas and finely divided solids through a reaction zone to the separation inlet means located in the bottom section or portion of the vessel. The advantages provided by this arrangement include, in a catalytic reaction such as the cracking of petroleum, true concurrent flow of gases and catalyst, substantially no gas recirculation or recracking of valuable gasoline product, substantially no dilution of reactor feed with stripping gas vapors, uniform catalyst residence time, cracking with more active and selective catalyst, decreased catalyst inventory and improved activity maintenance with resulting lower catalyst make-up rates.

This embodiment of the invention will become clear during the following description of the drawing wherein numeral 10 designates a catalytic reaction vessel wherein finely divided catalyst is dispersed in the vaporized hydrocarbon feed to be reacted. The reaction vessel 10 is provided with a gas-solids inlet 12 by way of which catalyst suspended in a vaporized hydrocarbon feed is introduced into the upper portion 14 of the vessel 10 which is provided with an outlet 16 by way of which cracked products are withdrawn, and, if desired transferred to subsequent processing operations such as a fractionating system, not shown.

The catalyst employed as a component of the feed to the vessel 10 can be from any convenient source and, as an illustration, can be the product of a catalyst regeneration operation as shown in the drawing. Thus catalyst can be led from a regenerator 18 through a regenerated catalyst standpipe 20 via regenerated catalyst slide valve 22, the outlet of which is in communication with hydrocarbon feed inlet 24. The hydrocarbon feed and catalyst flow through the regenerated catalyst transfer line 26, the outlet of which is in communication with the upper portion 14 of the vessel 10. Conveniently, the outlet of the transfer pipe, i.e. the gas-solids inlet 12, is provided with a plurality of slots 28 so that the discharged catalyst and hydrocarbon feed flow outwardly and then downwardly through the reaction zone to adjacent the bottom portion 30 of the vessel.

At least one gas-solid separation means 32 is provided, in combination, with the vessel 10. Preferably the separation means is located within the vessel 10 and if desired more than one such means can be utilized. As illustrated two separation means, serially interconnected are employed. Also, preferably, the gas-solids separator means consists of a cyclone separator, and in the illustrative example, separator 34 is the primary stage while separator 36 is the secondary stage. Separator 34 is connected to separator 36 by conduit 38 and separator 36 is connected by conduit 40 to a connection head 42 which, in turn, connects to outlet line 16. Each separator, 34 and 36, is provided with dip legs 44 and 46, respectively, for return of finely divided catalyst to the lower portion 30 of the vessel 10.

When a stripping or soaking zone 48 is provided for communication with the lower portion 30 of the vessel 10, the dip legs 44 and 46 can be sealed by extending into the fluid bed in the stripping zone 50. As an alternative the dip legs 44 and 46 can be made sufficiently long so as to discharge the spent catalyst into the dilute or disperse phase above the stripper bed. In this embodiment or modification flapper valves or other conventional sealing means such as baffle plates, check valves, gas seals, etc. can be used to avoid blowback of hydrocarbon vapors or stripping medium, such as steam, through the dip legs. The hydrocarbon vapor and finely divided solid catalyst flowing downwardly in vessel 10 through the reaction zone enter the primary stage cyclone separator 34 at the inlet 52 thereof and flow upwardly adjacent the vessel wall to the primary stage cyclone separator 34 and the secondary stage cyclone separator 36. The conversion products, now substantially solids free are discharged by line 16 and pass to a product recovery system, where, for instance a portion of the unconverted vapor can be separated and recycled to the feed inlet line 24 for further cracking in vessel 10.

In the embodiment shown in the drawings there is provided in association with reactor vessel 10, a stripping section or zone 48. Provision is made for introduction of stripping medium which can be inert gas but is, preferably, steam through at least one inlet line 54 which can be controlled by a valve 56 for removal of volatile material from the catalyst which is introduced into the stripper zone 50. The stripped catalyst flows downwardly through the spent catalyst standpipe 58, through slide valve 60 and is transported upwardly through the spent catalyst transfer line 62 by air which is introduced through air inlet 64 and mixed therewith. The mixture of air and spent catalyst are thus transferred to regenerator 18.

Regenerator 18 is provided with a gas-solids inlet 68 by way of which the spent catalyst suspended in combustion air flowing in spent catalyst transfer line 64 is introduced into the upper portion 70 of the regenerator vessel 18 which is provided with an outlet 72 by way of which substantially catalyst-free flue gas is withdrawn. Conveniently, the outlet of the transfer pipe 62 is provided with a plurality of slots 74 so that the discharged catalyst and air flow outwardly and then downwardly through the combustion zone to adjacent the bottom portion 76 of the vessel 18.

At least one gas-solid separation means is provided, in combination, with the regenerator 18. Preferably, the separation means is located within the vessel 18, as in the case of the reactor 10, and if desired more than one such separation means can be utilized. As illustrated, two separation means, serially interconnected are employed. Also, preferably, the gas-solids separation means consists of a cyclone separator, and in the illustrative example, separator 80 is the primary stage while separator 82 is the secondary stage. Separator 80 is connected to separator 82 by conduit 84 and separator 82 is connected by conduit 86 to a connection head 88 which, in turn, connects to outlet line 72. Each separator, 80 and 82, is provided with dip legs 90 and 92, respectively, for return of regenerated finely divided catalyst to the lower portion 76 of vessel 18. The dip legs 90 and 92 can be sealed by means of flapper valves or the like to avoid blowback of air up the dip legs. The spent catalyst and combustion air flowing downwardly in vessel 18 through the combustion zone, enter the primary stage cyclone separator 90 at the inlet 94 thereof and flow upwardly adjacent the vessel wall to the primary stage cyclone separator 80 and the secondary stage cyclone separator 82. A substantially catalyst free flue gas is withdrawn by line 72 while the regenerated catalyst flows through dip legs 90 and 92 and leaves through regenerated catalyst standpipe 20 for subsequent admixture with hydrocarbon feed and introduction into reactor vessel 10.

The following table summarizes the pertinent processing variables applicable to this embodiment of the invention and presents an example thereof:

|  | Range | Preferred |
|---|---|---|
| Reactor: | | |
| Conversion temperature, °F | 750–1,100 | 930 |
| Stripping temperature, °F | 750–1,100 | 930 |
| Solids/hydrocarbon feed ratio to transfer line, wt./wt | 2–30 | 5.0 |
| Solids velocity in transfer line, ft./sec | 10–40 | 20 |
| Vapor velocity in transfer line, ft./sec | 20–80 | 40 |
| Solids loading in transfer line, lbs./ft.³ | 0.5–10.0 | 1.8 |
| Superficial gas velocity in stripping zone, ft./sec | 0.5–2.0 | 1.0 |
| Solids residence time in reactor, average, secs | 1–75 | 16 |
| Vapor residence time in reactor, average, secs | 1–100 | 21 |
| Hydrocarbon partial pressure in reactor, p.s.i.g | 5–100 | 25 |
| Regenerator: | | |
| Conversion temperature, °F | 950–1,600 | 1,260 |
| Solids/air feed ratio to transfer line, wt./wt | 4–60 | 10 |
| Solids velocity in transfer line, ft./sec | 10–40 | 20 |
| Air velocity in transfer line, ft./sec | 20–80 | 40 |
| Solids loading in transfer line, lbs./ft.³ | 0.25–5.0 | 0.6 |
| Solids residence time in regenerator, average, secs | 1–75 | 31 |
| Air residence time in regenerator, average, secs | 1–100 | 41 |
| Pressure in regenerator, p.s.i.g | 5–100 | 25 |

This embodiment of the invention is not necessarily limited to the arrangement of equipment as shown in the drawing. Thus the downflow reactor 10 can be employed with a conventional upflow dense bed regenerator. Additionally rather than employing a side by side reactor 10 and regenerator 18, one of such vessels can be at an elevation different from the other or one vessel can be disposed directly below or above the other. Moreover, while the primary stage cyclone separator inlets 52 and 94 are shown as located adjacent the bottom 30 and 76 of the reactor and regenerator, respectively, and the cyclone separator assemblies 32 and 78 thereof are depicted disposed adjacent the top of the vessels, the instant invention also contemplates positioning the separator assemblies adjacent the bottom sections of the reactor and regenerator. Such an embodiment provides economic advantages occasioned by the use of more economic support means therefor. It will be recognized that other variations in the positioning of the equipment is feasible, the critical consideration being that the gas-solids inlet means is in communication with the upper porton of the vessel and the gas-solids separation inlet means be located below said gas-solids inlet means.

In yet other modifications of the instant invention the cyclone separator assemblies can be located outside the reactor 10 or regenerator 18 although it will be recognized that this necessitates additional piping and support requirements. Preferably the cyclone separators are installed within the vessels thus permitting them to be constructed with thinner metal walls since the pressure differential between the inside and outside of the separator is only a few pounds. Additionally when the separtors are housed within the vessels the dip legs do not have to pass through the vessel walls, thus eliminating added expense of fabricating the vessel.

The above-described physical arrangement of the gas-solids inlet means provides, in the novel process of this invention a downflow system which is a significant departure from conventional and commercially practiced systems. In the downflow system of the instant invention substantially all the catalyst that enters the reaction or combustion zone with the hydrocarbon vapors or combustion medium, respectively, leaves the zone with the hydrocarbon vapors or gaseous combustion products. In fact, the catalyst travels slightly faster than the gases. Thus, if the gas velocity is 2 ft./sec., the velocity of a typical catalyst is 2.3–3.2 ft./sec. Further the catalyst density at the top and bottom of the applicant's reaction or combustion zone is about 0.6 to 1.5 lb./cu. ft. depending on operating condtions employed.

These operating conditions are significantly different from conventional upflow systems especially when it is considered that in such systems, having either a dense bed or dilute phase, the gas-solid mixture travels at about 1 to 3 feet per second with significant catalyst particle slippage resulting in a significantly less dense phase at the top of the vessel than at the bottom. In an upflow system, operating under essentially the same conditions as applicant's downflow system, the density of the phase adjacent the top of the vessel is generally only about 0.25 to 0.4 lb./cu. ft.

In addition to providing a more uniform density in the bed, the downflow system of the instant invention also provides more uiform contacting of the hydrocarbon vapors with all the particles in the circulating catalyst. Additionally there is substantially no gas or catalyst recirculation within the reaction or combustion zone. Thus essentially all catalyst particles are employed substantially to the same extent and exhibit substantially the same level of carbon build-up. These characteristics of the applicant's novel downflow system result in a more efficient catalyst utilization as well as a better product distribution as compared to a conventional upflow dense bed or dilute phase system.

Yet another advantage of applicant's downflow regeneration system is decreased catalyst holdup. In conventional systems the holdup of catalyst in the regenerator is generally between 50 and 200 tons for each 10,000 b.p.d. of fresh feed to the reactor. However in applicant's downflow system catalyst holdup is usually about one-tenth of this amount. To compensate for the lower catalyst holdup a 50–100 degree higher temperature can be employed in the regenerator to obtain the required burning of the carbon deposited on the catalyst. While one might conclude that this higher temperature would result in increased catalyst deactivation and a resultant increase in catalyst makeup, applicant surprisingly has found that the deactivation temperature and the catalyst makeup rate is lower than when a conventional dense bed regenerator is used. This is attributable to the uniform level of carbon content laid down in the downflow reaction section.

IRON ORE REDUCTION PROCESS
AND APPARATUS

The disadvantages of conventional fluidized solids techniques, as discussed above, are also experienced in gas-solid chemical reactions such as iron ore reduction processes. In addition, such techniques are disadvantageous since many finely divided solids when undergoing a chemical reaction at an elevated temperature, undergo, simultaneously, a "sticking' or "agglomeration" phenomenon. Under these conditions severe bypassing of gas and powder occurs with the result that the reaction rate decreases to a very low value.

In certain specific chemical reactions, for instance in the reduction of iron ore as a fluid powder with hydrogen, carbon monoxide or mixtures thereof, prior investigators have encountered considerable difficulty in carrying out the reaction. Typical of the results in that reported by the Bureau of Mines in I 4092 June 1947 where it is reported that one was reduced in 12-inch beds in a 6-foot diameter reactor at 900°–1200° F. and concluded that the fluidized solids principle cannot be successfully applied to iron ore reduction. Also Tennenbaum and Squarcy in their paper "Direct Reduction of Iron Ore Using the Fluidized Solids Technique" to the Iron & Steel Institute in New York on May 23–24, 1951 report that they were unable to obtain the high degree of reduction desired even after long reaction times. They also report trouble with "sintering."

It has been found that one main source of difficulty in the fluid reduction of iron ore is that at some stage after reduction has started—usually less than 50% reduction—the partially reduced iron becomes "sticky" at the fluid bed tends to agglomerate, settle, and lose its "fluid" properties. As a result the gas by-passes most of the iron ore bed and the rate of the reduction reaction drops to a very low value, with the result that it is almost impossible to further reduce the bed. This phenomenon is a particular problem with fine powders and at elevated temperatures ranging between about 1200° to 1800° F. and higher.

Additionally in a conventional fluid bed process if high conversion of the solid is desired and if a powder is continuously fed and withdrawn from a bed which is well mixed, it is virtually impossible to avoid contaminating a completely reduced product with partially converted material. This is illustrated in the tabulation below for a first order reaction carried out in a reactor where there is no mixing in one case and where there is perfect mixing in the other case.

| Percent reaction | Time required | |
|---|---|---|
| | No Mixing | Perfect mixing |
| 0 | 0 | 0 |
| 25 | 0.29 | 0.33 |
| 50 | 0.70 | 1.0 |
| 75 | 1.39 | 3.0 |
| 90 | 2.3 | 9.0 |
| 95 | 3.0 | 19.0 |
| 98 | 3.9 | 49.0 |
| 99 | 4.6 | 99.0 |

It will be noted that a perfectly mixed reaction zone, such as a fluid bed, requires more time for a given conversion than a reaction zone where there is no mixing. The difference at low conversion levels is not marked but at high conversions is considerable.

It is thus apparent that a conventional dense fluid bed has serious limitations in the reduction of iron ore in that agglomeration readily occurs and high conversions require abnormally long reaction times.

In an attempt to overcome the "sticking" phenomenon observed at high temperatures, prior efforts have resorted to the commercial H-iron process which operates at a low temperature, i.e. about 800° to 900° F. The use of such low temperatures is disadvantageous in that only hydrogen can be used as the reducing gas and the reaction rate is very slow. The H-iron process compensates for this by operating at an elevated pressure, but this introduces other mechanical problems and costs.

There are also disadvantages in conducting chemical reactions in dilute phase upflow systems. For instance, W. A. Lloyd in his study of the Kinetics of Iron Ore Reduction (Ph.D Thesis, University of Minnesota, 1954) carried out reductions of iron oxide under dilute phase conditions. No limitations on conversion were observed. In a system in which fine iron oxide was entrained at low concentrations in hydrogen in an upflow reactor, $Fe_2O_3$ powder was reduced to the extent of 92% in about 6 seconds at 1110° F.; taconite powder was reduced to 92% in about 13 seconds at 1110° F. and $Fe_2O_3$ powder was reduced to 96% in 2 seconds at 1472° F. While it was thus demonstrated that fine iron ore could be reduced in a dilute phase system, nearly 50 times as much gas as theoretically required was employed to avoid backflow of powder. When appreciably less gas is used, slippage of the powder occurs and low capacities and conversions are encountered.

The instant invention overcomes the disadvantages of such prior art techniques and thus avoids agglomeration of the finely divided solids at the reaction temperature and further avoids contamination of the reducing gas in a reduction process in the reaction zone. This latter advantage is of particular significance, especially when steam is employed as the stripping medium since the reduction reaction is equilibrium limited and will be decreased by an amount equivalent to the steam present in the reactor zone.

The reaction vessel 10 shown in the drawing is equally suitable for carrying out this embodiment of the invention and as a detailed description of the components of the vessel have been described heretofore, further description is not deemed necessary.

In the process of reducing an ore such as iron ore, finely divided iron ore such as $Fe_2O_3$ or $Fe_3O_4$ are fed to the vessel 10 via transfer line 26 the outlet of which is in communication with the upper portion 14 of the vessel 10. The mixture flows outwardly through the slots 28 and then downwardly through the reducing zone adjacent the bottom portion 30 of the vessel. The reduced ore together with the gas then enter the primary cyclone separator inlet 52 located adjacent the bottom section of the vessel. Again, the important criteria is that the inlet to the separator be below the gas-solid inlet, or in this embodiment below the inlet for the mixture of iron ore and reducing medium. After passage through the cyclone separator assembly 32, the reduced iron ore discharges from the separators 34 and 36 through dip legs 44 and 46 respectively to the stripping zone 50 or to the bottom of the reactor. Again, the dip legs 44 and 46 must be of sufficient length to seal the cyclone separators thus preventing gas from rising through the dip legs to the separation chambers.

As in the catalytic reactor discussed above, it is also advantageous to strip the solid in a stripping zone with an inert gas to remove valuable and reactive reducing gas. Thus the stripper is positioned below the reducing zone and is provided with stripping medium inlet 54, controlled by valve 56. Preferably, the stripping medium is steam. The stripped reduced ore flows downwardly through the standpipe 58 through slide valve 60 and is recovered.

The following table summarizes the pertinent processing variables applicable to this embodiment of the invention and presents an example thereof:

| | Range | Preferred |
|---|---|---|
| Reducing temperature, ° F | 1,100-1,900 | 1,500. |
| Stripping temperature, ° F | 1,100-1,900 | 1,500. |
| Finely divided ore/reducing gas ratio in transfer line, wt./wt. | 0.1-10 | 2.3. |
| Finely divided ore velocity in transfer line, ft./sec. | 15-60 | 30. |
| Reducing gas velocity in transfer line, ft./sec. | 20-80 | 40. |
| Finely divided ore loading in transfer line, lbs./ft.³ | 0.005-0.5 | 0.032. |
| Superficial gas velocity in stripping zone, ft./sec. | 0.5-2.0 | 1.0. |
| Finely divided ore residence time in reactor, average, secs. | 1-90 | 20. |
| Reducing gas residence time in reactor, average, secs. | 1-100 | 23. |
| Reducing gas partial pressure in reactor, p.s.i.g. | 5-500 | 50. |
| Reducing gas | $H_2$,CO, or mixtures. | $H_2$-CO mixture. |
| Finely divided ore | $Fe_2O_3$, $Fe_3O_4$. | $Fe_2O_3$. |
| Stripping medium | Inert gas | Steam. |

I claim:
1. A process for cracking hydrocarbons which comprises injecting a mixture of hydrocarbons and finely divided solid particles into the upper portion of a vertically disposed reactor, said particles being circulated between said reactor and a regenerator, said reactor being maintained at a temperature of from about 750° to 1100° F., said finely divided solid particles being inert, flowing substantially all of said hydrocarbon and finely divided solid particles mixture downwardly to the lower portion of said reactor whereby said hydrocarbon is cracked, introducing said cracked hydrocarbon and finely divided solid particles in the lower portion of said reactor into the inlet or a gas-solids transfer conduit and transferring said cracked hydrocarbon and finely divided solid particles to a gas-solids separation zone housed within said reactor adjacent the upper portion thereof whereby said cracked hydrocarbon and finely divided solid particles mixture flow upwardly through said transfer conduit to said separation zone, separating the finely divided solid particles from said cracked hydrocarbon in said separation zone, withdrawing the cracked hydrocarbon from said separation zone and said reactor, and returning said separated finely divided solid particles to said regenerator.

2. The process of claim 1 which includes stripping said separated finely divided particles prior to return to said regenerator.

3. Apparatus for contacting gases and finely divided solids comprising:
 (a) a contacting vessel;
 (b) gas-solids inlet feed means in communication with the upper portion of said contacting vessel for introducing a gas-solids mixture therein;
 (c) gas-solids separation means comprising a plurality of serially interconnected cyclone separators housed in said contacting vessel adjacent the upper portion thereof;
 (d) gas-solids transfer means comprising a substantially vertically disposed conduit extending from the upper portion of said contacting vessel to the lower portion thereof, one end of said conduit being connected to the inlet of said cyclone separator, the other end being open and in communication with the lower portion of said contacting vessel whereby gas-solids mixture from the lower portion of said contacting vessel is transferred therefrom through said conduit to said gas-solids separation means, said open other end being disposed below said gas-solids inlet feed means;
 (e) said gas-solids separation means having a dip leg extending adjacent the bottom of said contacting vessel;
 (f) means for withdrawing gas from said contacting vessel adjacent the upper portion thereof, said gas withdrawing means being in communication with said cyclone separator;
 (g) means for withdrawing solids from said contacting vessel adjacent the lower portion thereof;
 (h) means for stripping said solids withdrawn from said contacting vessel, said stripping means being in communication with the bottom of said contacting vessel;
 (i) a solids regenerating vessel;
 (j) gas-stripped solids inlet feed means in communication at one end with the upper portion of said solids regenerating vessel and at the other end with said stripping means for introducing a gas-stripped solids mixture to said solids regenerating vessel;
 (k) gas-regenerated solids separation means comprising a cyclone separator housed in said solids regenerating vessel adjacent the upper portion thereof;
 (l) gas-regenerated solids transfer means comprising a substantially vertically disposed conduit extending from the upper portion of said solids regenerating vessel to the lower portion thereof, one end of said conduit being connected to the inlet of said cyclone separator, the other end being open and in communication with the lower portion of said solids regenerating vessel whereby a gas-regenerated solids mixture from the lower portion of said solids regenerating vessel is transferred therefrom through said conduit to said gas-regenerated solids separation means, said open other end being disposed below said gas-stripped solids inlet feed means;
 (m) said gas-regenerated solids separation having a dip leg extending adjacent the bottom of said solids regenerating vessel;
 (n) means for withdrawing gas from said solids regenerating vessel adjacent the upper portion thereof, said gas withdrawing means being in communication with said gas-regenerated solids separation means; and
 (o) means for withdrawing regenerated solids from said solids regenerating vessel adjacent the lower portion thereof.

4. The apparatus of claim 3 wherein said gas-regenerated solids separation means comprises a plurality of serially interconnected cyclone separators.

References Cited

UNITED STATES PATENTS

| 2,549,117 | 4/1951 | Nelson | 208—48 |
| 2,614,069 | 10/1952 | Matheson | 208—163 |
| 2,923,678 | 2/1960 | Schutte | 208—148 |
| 3,074,878 | 1/1963 | Pappas | 208—153 |
| 3,188,185 | 6/1765 | Slyngstad et al. | 208—164 |

HERBERT LEVINE, Primary Examiner

U.S. Cl. X.R.

23—288; 75—26; 208—148